United States Patent [19]

Sekido et al.

[11] 4,315,975
[45] Feb. 16, 1982

[54] SOLID-STATE LITHIUM-IODINE PRIMARY BATTERY

[75] Inventors: Satoshi Sekido, Yawata; Tadashi Sotomura, Kashiwara; Muneaki Nakai, Tokonaka, all of Japan

[73] Assignee: Matsushita Electric Industrial Co., Ltd., Osaka, Japan

[21] Appl. No.: 175,734

[22] Filed: Aug. 6, 1980

[30] Foreign Application Priority Data

Aug. 15, 1979 [JP] Japan .................................. 54-103728
Dec. 28, 1979 [JP] Japan .................................. 54-171154

[51] Int. Cl.³ ............................................. H01M 6/18
[52] U.S. Cl. .................................. 429/191; 429/213; 429/199
[58] Field of Search ............... 429/213, 101, 191, 218, 429/199

[56] References Cited

U.S. PATENT DOCUMENTS

| | | | |
|---|---|---|---|
| 3,937,635 | 2/1976 | Mead et al. | 429/199 |
| 3,944,433 | 3/1976 | Mead et al. | 429/213 |
| 4,128,703 | 12/1978 | Mead et al. | 429/101 |
| 4,148,975 | 4/1979 | Schneider et al. | 429/213 X |
| 4,148,976 | 4/1979 | Sekido et al. | 429/191 |
| 4,182,797 | 1/1980 | Kondo et al. | 429/191 |

*Primary Examiner*—Anthony Skapars
*Attorney, Agent, or Firm*—Joseph W. Farley

[57] ABSTRACT

A solid-state primary cell comprising a lithium anode, a cathode comprising iodine particles not more than 77 $\mu$m in diameter and a charge transfer complex of iodine with an aromatic heterocyclic compound, and a lithium iodide based solid electrolyte. The cell has an anode current collector which can be coated with a polyimide film on part of its surface for giving improved discharge characteristics to the cell.

5 Claims, 7 Drawing Figures

SOLID-STATE LITHIUM-IODINE PRIMARY BATTERY

The present invention relates to solid-state lithium-iodine complex primary cells comprising an active anode material, i.e. lithium, an active cathode material in the form of a mixture of iodine and a charge transfer complex of iodine with an aromatic heterocyclic compound, and a solid electrolyte formed by the reaction of the active anode material with the active cathode material in contact therewith.

With primary cells of the type mentioned, the separator which is required for usual cells need not be interposed between the active cathode material and the active anode material. The cathode consisting chiefly of iodine and the lithium metal anode, when brought into direct contact with each other in the fabrication of the cell, undergo a self-discharge reaction which is peculiar to the cell and represented by $2Li+I_2 \rightarrow 2LiI$ and which proceeds at a very low velocity following the fabrication, consequently forming a solid electrolyte layer of lithium iodide at the interface between the two electrodes. The electrolyte layer serves as a separator for separating the electrodes to provide a high-energy cell of 2.8 V.

After the fabrication of the cell, the solid electrolyte layer continuously grows through the abovementioned self-discharge reaction due to the diffusion of iodine from the cathode through the layer. With the growth of the layer, the layer hinders the reaction between lithium and the iodine which diffuse through the layer, with the result that the internal resistance of the cell increases at a rate proportional to the square root of the storage time of the cell. During discharge, the separator layer also grows with the discharging to increase the internal resistance of the cell. The working voltage $V_t$ of the cell system is represented by the equation $$V_t = 2.80 - A\sqrt{t_o + t} \cdot i/s - B \cdot t \cdot i^2/s^2$$

wherein A and B are constants relating to the ionic conductivities of the solid electrolyte consisting predominantly of LiI formed during storage and discharging, respectively, $t_o$ is storage period, t is discharge period, i is discharge current value, and s is the area of the lithium anode in contact with the cathode immediately after the fabrication of the cell. The A and B values reflect the ionic conductivities of the solid electrolyte formed during storage and discharge, respectively. More specifically, the value of A reflects the conductivity, $10^7$ ohm-cm, of LiI which is the electrolyte produced during storage, and B is a value reflecting the conductivity of the solid electrolyte chiefly of LiI formed during discharge, for example, $10^5$ to $10^6$ ohm-cm when a 1-n-alkylpyridinium polyiodide complex is used for the cathode. Accordingly when the cell of the type described has a thickness of about 0.2 cm, the current value at which the active cathode material filling the cell can be used nearly 100% is several tens of microamperes per unit area (1 cm$^2$) of the lithium anode. This value is smaller than is the case with usual cells containing a liquid electrolyte. However, with the trend in recent years that electronic devices are of decreasing size with greater savings assured in power consumption, cells of the type described, which do not require any separator and can therefore be filled with larger amounts of active materials relative to the interior volume, are provided in smaller thicknesses or sizes, with the resulting advantage that they have a higher capacity than usual cells including an electrolytic solution and a separator. Thus attention has been directed to cells of the foregoing type.

In order to further enhance the above advantage, an attempt has been made to increase the iodine content of the active cathode material by incorporating iodine particles into the cathode material in an exceedingly larger amount than the amount of iodine taken into a charge transfer complex by merely mixing the iodine and aromatic heterocyclic compound. Additionally the amount of the active cathode material to be contained in the cell relative to its interior volume can be increased by incorporating a larger amount of iodine into the charge transfer complex to increase the density of the active cathode material. For example, when poly-2-vinylpyridine (hereinafter referred to as "P-2VP") is used as the aromatic heterocyclic compound for forming a charge transfer complex along with iodine, the iodine is used in the proportion of 20 iodine atoms per pyridine group. Of these iodine atoms, 2 or 3 atoms readily form the complex when iodine is admixed with P-2VP, but the remaining iodine portion can not be easily incorporated into the complex and remains as particles of iodine element.

When a 1-alkylpyridinium is used as the aromatic heterocyclic compound, iodine is used in the ratio of 13 to 17 iodine atoms per pyridinium ion. About 9 of these atoms readily form a charge transfer complex when iodine is admixed with the pyridinium, but the remaining iodine portion similarly can not be easily incorporated into the complex and remains as iodine particles slightly converted to the complex over their surfaces or as particles of elemental iodine. Solid-state lithium-iodine primary cells containing these two active cathode substances and having an outside diameter of 23 mm and a small thickness of 1.0 mm have a capacity of about 0.45 wh/cc, which is much greater than about 0.35 wh/cc afforded by cells of liquid electrolyte type having the same dimensions and containing $Li/(CF)_n$ or $Li/MnO_2$.

In this way, iodine particles are incorporated in the active cathode material to give increased energy. However, no consideration has been given to the shape of iodine particles to be contained therein. Irregularities in the size of iodine particles admixed with the active cathode material produce unevenness in the iodine activity in the surface of the cathode material in contact with the lithium anode. Consequently portions of the lithium anode subjected to high activity of iodine undergo a concentrated self-discharge reaction and become corroded in the form of pits during the storage of the cell for the reason to be described later. This seriously impairs the discharge characteristics of the cell during storage. Furthermore, when stored at high temperatures for a prolonged period of time, the cell is subject to internal shorting for the reason to be given later.

The main object of the invention is to provide an improved solid-state lithium-iodine primary cell having a high energy density, incorporating an active cathode material of increased iodine content and free of deterioration of its discharge characteristics and fine internal shorting during storage.

The cell of this invention comprises metallic lithium serving as an active anode material, and an active cathode material in the form of a mixture of a charge transfer complex of iodine with an aromatic heterocyclic compound and particles of elemental iodine which need to be incorporated in the cathode to give a high energy density to the cell.

The cell is fabricated by bringing the active cathode material into direct contact with the active anode material. When thus contacted, the active materials undergo the reaction of $2Li + I_2 \rightarrow 2LiI$, forming at the interface between the two materials a solid electrolyte layer acting as a separator and consisting predominantly of LiI. Iodine particles of up to 77 $\mu$m in size are used as the elemental iodine particles, whereby the reaction is effected uniformly in the surface of the lithium anode, consequently giving stabilized characteristics to the cell during storage.

Preferably liquid alkylpyridinium polyiodides are used as charge transfer complexes. Further preferably the active cathode material is in the form of a mixture comprising a charge transfer complex of 1-n-butyl-pyridinium polyiodide, elemental iodine up to 77 $\mu$m in particle size and silica gel up to 10 $\mu$m in average particle size and suited for use in chromatographic analysis.

The invention provides another improved cell comprising an anode current collector having a halogen-resistant insulating film, preferably a polyimide film, on the surface thereof facing the lithium anode except where the surface is electrically connected to the anode. The film, when provided, serves to mitigate the improper shorting that would result during discharge from the unevenness inevitably involved in the thickness of the film-like lithium anode to be incorporated into a thin cell.

Various other features and advantages of this invention will become apparent from the following detailed description with reference to the accompanying drawings, in which.

Before describing the present invention, a description will be made of the mode in which a lithium anode is corroded by an iodine active cathode material with reference to FIGS. 1a and 1b.

Figure 1A:
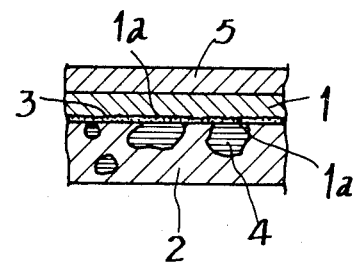
FIGS. 1a and 1b are diagrams in section of a solid-state lithium-iodine complex primary cell to schematically illustrate how the lithium anode is corroded by the iodine complex active cathode material, FIG. 1a showing the cell immediately after fabrication and FIG. 1b showing the same during storage.
Figure 1B:
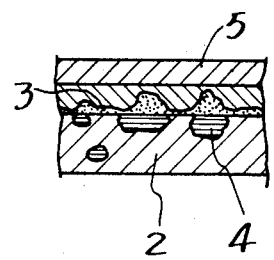

As already described, it has been attempted to increase the iodine content of the active cathode material to provide cells of high-energy capacity, but no consideration has been given to the shape of iodine particles to be incorporated in the material, so that irregularities in the size of iodine particles in the cathode material produce uneven distribution of the amount of iodine in the surface of iodine complex active cathode material 2 in contact with the lithium anode 1 as seen in FIG. 1a. During the storage of the cell, therefore, iodine diffuses through an electrolyte layer 3 to undergo the self-discharge reaction of $2Li + I_2 \rightarrow 2LiI$ with lithium concentrically at the portions 1a of the lithium anode where iodine particles 4 are in contact with the anode, as illustrated in FIG. 1b. The lithium anode is consequently corroded in the form of pits. When the cell is discharged after the storage, the pitted anode portions, where the resulting electrolyte layer has a larger thickness than the other portion, are almost inert to the discharge reaction, with the result that the lithium anode has a substantially reduced effective area. Marked polarization therefore takes place during discharge. Further if the cell is stored at high temperatures for a prolonged period of time, the pitted portions extend to the current collector 5 for the anode. The anode current collector 5, which is usually made of a metal electrochemically nobler than the lithium anode, will not form, unlike lithium, an ion-conductive corroded layer by contact with iodine and is electrically connected to the cathode through the LiI solid electrolyte in the pits which is converted to a P-type semiconductor in the presence of excessive iodine and thereby rendered electron-conductive. Thus the cell is subject to fine internal short-circuiting.

The main object of the invention is to use elemental iodine particles of selected size as incorporated in the active cathode material to assure uniform distribution of iodine particles over the surface of the cathode in contact with the lithium anode, so that even when the lithium anode surface is pitted by corrosion, the pits will be formed with uniform distribution over the surface and also to a reduced extent to thereby eliminate the influence of the iodine particles on the surface of the cathode.

Embodiments of the invention will be described below with reference to FIGS. 3 to 6.

EMBODIMENT 1

Figure 2:
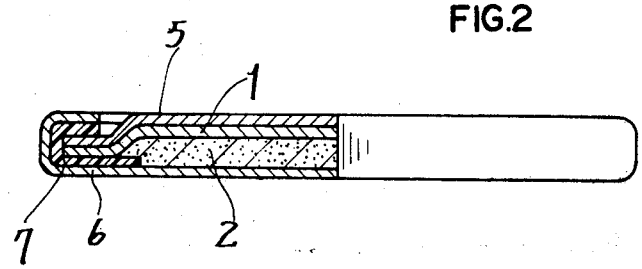
FIG. 2 is a front view partly in section and showing a solid-state lithium-iodine complex primary cell of the flat type.

FIG. 2 is a view partly in section and showing a solid-state lithium-iodine complex primary cell of the flat type used for substantiating the advantages of the invention and having an outside diameter of 22.4 mm and a thickness of 1.0 mm.

Indicated at 1 is a lithium anode 200 $\mu$m in thickness, at 2 a cathode composition containing iodine, at 5 an anode current collector, at 6 a cathode current collector, and at 7 a gasket.

Cells of the above construction were prepared using iodine-containing cathode compositions of the ingredients given below. Elemental iodine particles of varying sizes were used for the compositions as listed in Table 1. For the evaluation of the advantages of the invention, the cells were tested for the reduction in open circuit voltage after storage at 60° C. for 30 days and also for the duration of discharge at 20° C. and 30 $\mu$A until the voltage dropped to 2.40 V. The results are shown in Table 1. 1-n-Butyl-pyridinium iodide as an aromatic heterocyclic compound was admixed with iodine particles of specified size in the ratio of 17 iodine atoms per molecule of the pyridinium to obtain an active cathode material in which both solid and liquid are coexistent. The cathode material was then admixed, in the ratio of 5:1 by weight, with silica gel suited for chromatography and having an average particle size of up to 10 $\mu$m to obtain a powder for use as the cathode composition. The cells were fabricated in an argon gas atmosphere up to 10 p.p.m. in water content.

Table 1 reveals that the cells of this invention exhibit outstanding storage performance when incorporating iodine particles 100% of which are minus 200-mesh size (up to 77 μm).

TABLE 1

| Cell | Size of elemental iodine particles (μm) | (mesh*) | Reduction in open circuit voltage** (mV) | Duration of discharge (hr) |
|---|---|---|---|---|
| A | 250–150 | 55 | 80 | 190 |
| B | 149–78 | 100 | 95 | 280 |
| C | 77–54 | 200 | 12 | 745 |
| D | 53–45 | 280 | 8 | 720 |
| E | 44–39 | 325 | 6 | 780 |
| F | Up to 38 | 400 | 7 | 755 |

*The smallest mesh size of the screen through which 100% of the particles pass.
**After storage at 60° C. for 30 days.

EMBODIMENT 2

Cells G to O of the same type as Embodiment 1 were prepared using cathode compositions containing 1-n-butyl-pyridinium iodides as aromatic heterocyclic compounds and varying iodine contents. The advantage of the invention was evaluated in terms of the characteristics of the cells after storage at 60° C. for 30 days. Iodine particles 100% of which were minus 200 mesh were used for the preparation of the active cathode materials. Silica gel useful for chromatography was used which was up to 10 μm in average particle size. The cells were fabricated in an argon atmosphere up to 10 p.p.m. in water content.

Since iodine particles of above-mentioned size are used for the cells G to O, they satisfactorily have the outstanding advantage of the invention despite the high iodine contents. However, in case 1-n-butylpyridinium iodide is used as the aromatic heterocyclic compound, the advantage of the invention can be assured more effectively if the iodine content in the cathode composition is up to 27 iodine atoms per molecule of 1-n-butyl-pyridinium. With more than 27 iodine atoms present, slightly impaired storage characteristics will result. This appears to us attributable to the following cause. When more than 27 iodine atoms are present, the liquid complex of iodine and 1-n-butyl-pyridinium is unable to fully wet the surfaces of the iodine particles within the cathode composition, permitting coagulation of several particles which produce the same effect on the storage performance as when larger size iodine particles are used for the preparation of the active cathode material.

TABLE 2

| Cell | Number of I atoms* | Silica gel content (wt. %) | Reduction in open circuit voltage** (mV) | Duration of discharge (hr) |
|---|---|---|---|---|
| G | 17 | 17 | 6 | 780 |
| H | 19 | 16 | 5 | 810 |
| I | 21 | 14 | 5 | 830 |
| J | 23 | 13 | 8 | 760 |
| K | 25 | 12 | 12 | 780 |
| L | 27 | 12 | 10 | 740 |
| M | 29 | 10 | 28 | 585 |
| N | 31 | 10 | 24 | 550 |
| O | 33 | 9 | 35 | 520 |

*The number of iodine atoms per molecule of 1-n-butyl-pyridinium.
**After storage at 60° C. for 30 days.

EMBODIMENT 3

The following cells were prepared: cell P with use of an active cathode material containing P-2VP as an aromatic heterocyclic compound and 20 iodine atoms per pyridinium group, cell Q with use of an active cathode material containing perylene and 20 iodine atoms per molecule of perylene, and cells R, S and T with use of active cathode materials containing 1-ethyl-pyridinium, 1-n-propyl-pyridinium and 1-n-butyl-pyridinium, respectively, and 20 iodine atoms per molecule of the pyridinium. These cells were tested for characteristic after storage at 60° C. for 30 days to evaluate the advantages of the invention. Iodine particles 100% of which were minus 280 mesh were used. Cells P' and Q' similar to the cells P and Q in that P-2VP and piperylene were used respectively were prepared using iodine particles 100% of which were minus 100 mesh but plus 200 mesh. Silica gel for chromatography was used which was up to 10 μm in average particle size. The cells were fabricated in an argon atmosphere having a water content of up to 10 p.p.m.

The cells P, P', Q and Q' differ from the cells R, S and T in the conductivity of the solid electrolyte, the product of the cell discharge reaction, which conductivity governs the degree of discharge polarization, and are therefore not comparable with the latter cells in the duration of discharge. However, since the cells P to T undergo the same self-discharge reaction of 2Li+I$_2$→2LiI during storage, the cells can be compared in terms of the reduction in the open circuit voltage after the storage for the evaluation of the advantages of the invention. Thus, the cells containing 1-alkyl-pyridinium iodides as aromatic heterocyclic compounds according to the invention produce useful results. Especially the cell including 1-butyl-pyridinium iodide achieves outstanding results. The superiority of the 1-alkyl-pyridinium iodides to other aromatic heterocyclic compounds appears attributable to the following reason. The charge transfer complex of iodine with the 1-alkyl-pyridinium, which is in the form of a liquid as already stated in Embodiment 2, permits satisfactory dispersion of the iodine particles in the active cathode material without allowing coagulation of the iodine particles, also assuring uniform dispersion of such particles in the face of the cathod material in contact with the lithium anode to effect uniform corrosion of the anode. The charge transfer complex of iodine with P-2VP is in the form of plastics, while that of iodine with perylene is in the form of solid particles. Since these complexes fail to effect sufficient dispersion of iodine particles, they appear inferior in characteristics to those incorporating 1-alkyl-pyridinium iodides although producing to a certain degree the effects contemplated by the invention.

Thus the present invention provides solid-state lithium-iodine complex primary cells of improved storage performance.

TABLE 3

| Cell | Silica gel content (wt. %) | Reduction in open circuit voltage* (mV) | Duration of discharge (hr) |
|---|---|---|---|
| P | 0 | 22 | 210 |
| P' | 0 | 59 | 120 |
| Q | 0 | 16 | 125 |
| Q' | 0 | 78 | 60 |
| R | 10 | 12 | 715 |
| S | 15 | 13 | 770 |

TABLE 3-continued

| Cell | Silica gel content (wt. %) | Reduction in open circuit voltage* (mV) | Duration of discharge (hr) |
|---|---|---|---|
| T | 15 | 7 | 805 |

*After storage at 60° C. for 30 days.

Figure 3:
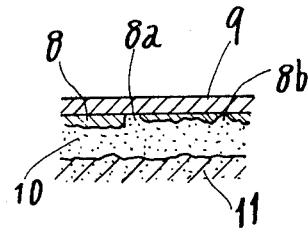
FIG. 3 is a front view showing a portion of a discharged cell in section in the vicinity of the lithium anode.
Figure 4:
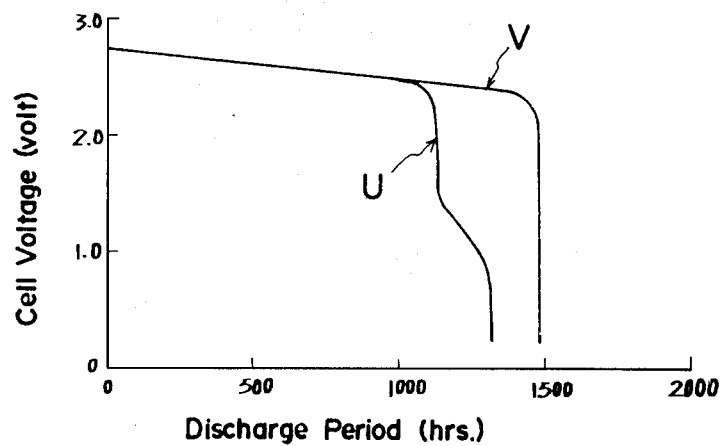
FIG. 4 is a graph showing voltage during the discharge of cells.

FIG. 3 is a sectional view showing a portion in the vicinity of the lithium anode of a cell U having the same construction as the cell G in Embodiment 2 except that the lithium anode is in the form of a film having an average thickness of 100 μm, after the cell U has been discharged at 20° C. and current value of 30 μA. Indicated at 8 is a portion of the anode which has not been used for the discharge, at 9 an anode current collector, at 10 the solid electrolyte formed mainly by the discharge reaction, and at 11 a cathode composition. The lithium anode has been completely consumed at portions 8a and 8b, where the anode current collector 9 is electrically connected to the cathode composition 11 through the solid electrolyte 10. In FIG. 4, a curve U represents the voltage of the cell U shown in FIG. 3 during the discharge. The voltage drops abruptly in the course of the discharge.

EMBODIMENT 4

Figure 5:
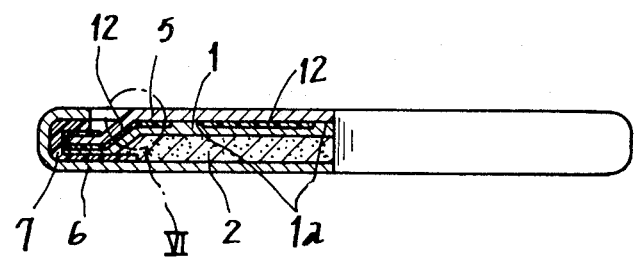
FIG. 5 is a front view partly in section and showing a cell including a halogen-resistant insulating film.

FIG. 5 shows a solid-state primary cell embodying the invention, having a halogen-resistant, electrically insulating film and shaped in the form of a coin with an outside diameter of 22.4 mm and a thickness of 1.0 mm. The parts shown in FIG. 5 and referred to by the same numerals as used in FIG. 2 are the same components as those shown in FIG. 2 except that the lithium anode 1 has an average thickness of 100 μm. Indicated at 12 is the halogen-resistant, insulating film at least covering the surface of an anode current collector 5 facing an active anode material 1 except a portion 1a where the surface is electrically connected to the material 1. The film of this embodiment is a polyimide film 10 to 15μ in thickness formed by dissolving 17 to 23% by weight of molecular chains of a low-molecular-weight polyimide in a solvent mixture of N-methyl-2-pyrrolidone and N,N-dimethylacetamide to obtain an insulating varnish, applying the varnish to the above-mentioned part of the surface of the anode current collector 5 in a dry atmosphere and heating the coating at successively elevated temperatures of 100° C., 250° C. and 350° C. for about 1 hour at each of these temperatures for polymerization.

Figure 6:
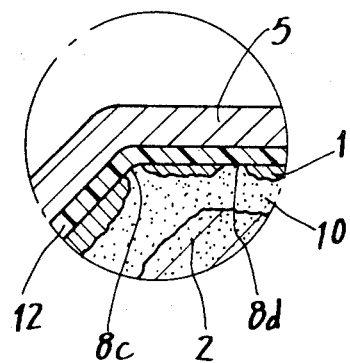
FIG. 6 is a sectional front view showing a portion, indicated by an arrow VI in FIG. 5, of the cell after the cell has been discharged.

FIG. 6 shows the portion of FIG. 5 surrounded by a circle and indicated by an arrow VI after the cell has been discharged at 20° C. at a constant current value of 30 μA. As the case with FIG. 3, the lithium anode has been completely consumed at portions 8c and 8d. The curve V in FIG. 4 represents the voltage of the cell V shown in FIG. 6 during the discharge. Unlike the cell U having no halogen-resistant film, the cell V is free of an abrupt voltage drop during the discharge. This indicates that the halogen-resistant, insulating film 12 of this invention acts effectively.

Other halogen-resistant insulating films which seem useful include those formed from an aqueous suspension of fluorine-containing resin, such as polyethylene tetrafluoride resin, by coating and heating, and films of halogen-resistant resins, such as polyethylene tetrafluoride, polyvinylidene fluoride, polyethylene, polypropylene, etc. which are applicable by heat adhesion. Nevertheless, we have found that these films are all low in adhesion to the anode current collector which is of metal material, such that a clearance will be formed between the film and the anode current collector under the mechanical impact to be involved in the fabrication of the cell, with the resulting likelihood that the active anode material pressed against the anode current collector for electrical connection thereto will be pushed down by the film out of the electrical connection with the collector. On the other hand, the polyimide film of the present embodiment which is formed by applying a solution of low-molecular-weight polyimide to the collector and polymerizing the coating with heating covers the metal surface along the minute projections and indentations on the surface and therefore has relatively high mechanical bond strength. The film thus produces the effect of the invention free of the above drawback.

One hundred cells V each having a polyimide film and 100 cells U having no polyimide film were discharged at 20° C. at a current value of 30 μA. Table 4 shows the number of cells with which an abrup discharge voltage drop was observed. It is seen that the cell V is much less susceptible to a voltage reduction than the cell U. This shows that the polyimide film of the invention acts effectively.

TABLE 4

| Cell | Number of cells undergoing abrupt voltage drop (per 100 cells) |
|---|---|
| V | 2 |
| U | 28 |

What is claimed is:

1. A substantially anhydrous cell comprising a lithium anode, a cathode comprising iodine particles not more than 77 μm in diameter and a charge transfer complex consisting of iodine and a 1-normal-alkyl-pyridinium iodide, and a lithium iodide based solid electrolyte formed on the lithium anode surface by contact of the lithium anode with the iodine cathode in assembling the cell.

2. A cell according to claim 1 in which the cathode is a mixture comprising a silica gel powder, the iodine particles, and the charge transfer complex of iodine with the 1-normal-alkyl-pyridinium iodide.

3. A cell according to claim 2 in which the 1-normal-alkyl-pyridinium iodide is 1-normal-butyl-pyridinium iodide.

4. A cell according to claim 2 in which the mixture has up to 27 atoms of iodine for each nitrogen atom of the 1-normal-alkyl-pyridinium ion.

5. A cell according to claim 1, 2, 3 or 4 which includes an anode current collector having a surface facing the lithium anode, said surface having a polyimide coating composition applied thereto except where said surface is electrically connected to the anode.

* * * * *